Figure 1:
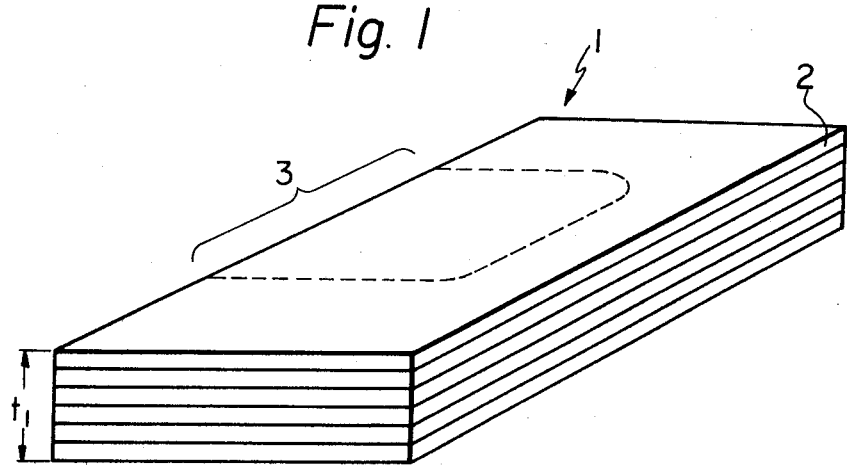

United States Patent [19]

Fujishima et al.

[11] 4,079,430
[45] Mar. 14, 1978

[54] MAGNETIC HEAD

[75] Inventors: Hiroki Fujishima; Kazuo Ohya, both of Tokyo, Japan

[73] Assignee: TDK Electronics, Co., Ltd., Tokyo, Japan

[21] Appl. No.: 656,864

[22] Filed: Feb. 10, 1976

[30] Foreign Application Priority Data

Feb. 15, 1975  Japan .................................. 50-19341

[51] Int. Cl.$^2$ .......................... G11B 5/14; G11B 5/12
[52] U.S. Cl. .................................... 360/126; 360/125
[58] Field of Search ..................... 360/4, 56, 110, 122, 360/125, 126, 127, 112; 29/602, 603; 75/123 K, 128 P

[56] References Cited

U.S. PATENT DOCUMENTS

| B 59,512 | 3/1976 | Berchtold | 360/125 |
| 3,417,386 | 12/1968 | Schneider | 360/127 |
| 3,863,268 | 1/1975 | Ikeda | 360/125 |
| 3,943,570 | 3/1976 | Yamamoto | 360/112 |

*Primary Examiner*—Robert M. Kilgore
*Attorney, Agent, or Firm*—Burgess, Ryan and Wayne

[57] ABSTRACT

Amorphous metal alloys are employed in a magnetic head as core materials in the present invention. Such alloys are generally composed of M and Y, wherein M is at least one of Fe, Ni and Co and Y is at least one of P, B, C and Si. The amorphous metal alloys used are marked by a combination of the desirable properties of conventional permalloy with those of conventional ferrites.

13 Claims, 2 Drawing Figures

MAGNETIC HEAD

The present invention relates to a magnetic head, and more particularly a magnetic recording, reproducing and erasing head intended for use in a tape recorder, a videotape recorder, an electronic computer, etc.

Permalloy is widely used as a magnetic core of a magnetic head because of its excellent magnetic properties. However, permalloy has a disadvantage in that its poor wear resistance leads to a shorter service life than a single crystal of ferrite.

A single crystal ferrite exhibits high wear resistance, however, it is inferior in magnetic properties to permalloy. In addition, the plastic working, such as blanking, cannot be employed in producing a magnetic head from a single crystal of ferrite and, as a result, such expensive operations as precision cutting or surface grinding become inevitable. This increases the number of production steps as well as the cost of the magnetic head.

Further, since the above mentioned single crystalline ferrite should have a particular crystalline orientation, to provide them with the optimum wear resistance, it is required to select materials having such a particular orientation.

It is, therefore, an object of the present invention to provide a magnetic head which simultaneously satisfies all of the required wear resistance, magnetic and high frequency properties, thereby removing the disadvantages of the conventional permalloy and ferrite magnetic heads.

The inventors have discovered that a magnetic head composed of an amorphous metal alloy exhibits magnetic and high frequency characteristics superior or at least equal to the conventional permalloy, and, further, has a wear resistance as high as one composed of ferrite.

An amorphous substance is generally characterized by the fact that its structure is noncrystalline. To distinguish an amorphous substance from a crystalline substance X-ray diffraction measurement is generally employed. In this regard, an amorphous metal alloy produces a diffraction profile which varies slowly with the diffraction angle, but does not have sharp diffraction peaks which are reflected from the lattice planes of crystals formed in an equilibrium state. It is, therefore, possible to calculate the ratio of observed height of peaks with respect to the theoretical height of the known standard peaks of crystals, and the amorphous degree is expressed in terms of this ratio.

The inventors have discovered that an amorphous metal alloy which is at least 50%, preferably not less than 75%, amorphous possesses:

a coercive force (Hc) of not more than 0.2 oersted;

a maximum magnetic flux density (Bm) of not less than 5,500 gauss, preferably not less than 8,700 gauss;

a specific resistivity ($\phi$) of not less than $150 \times 10^{-6} \Omega$-cm;

an initial permeability ($\mu_o$) of not less than $20 \times 10^3$, and;

a Vickers hardness (Hv) of not less than 600.

The typical properties of permalloy are:

$Hc = 0.006$, $Bm = 7,900$, $\phi = 55 \times 10^{-6}$, $\mu_o = 7 \times 10^3$, and $Hv = 150$;

those of sintered ferrite are:

$Hc = 1.5$, $Bm = 2,500$, $\phi = 10^7$, $\mu_o = 200$, and $Hv = 400$; and;

those of single crystalline ferrite are:

$Hc = 0.1$, $Bm = 4,000$, $\phi > 1$, $\mu_o = 2 \times 10^3$ and $Hv = 400$.

Consequently, the amorphous alloy according to the present invention is well suited for a magnetic head for the following reasons. Firstly, eddy current loss, which is detrimental to a high frequency property, is determined by the formula:

$$S = \sqrt{(f \cdot \rho)/(\pi \cdot \mu_o)}$$

wherein $f$ is the frequency of the current passing through a coil wound around a magnetic body, which forms a closed magnetic circuit. Therefore, the eddy current loss (S) is considered to be proportional to $\sqrt{\phi}$. The eddy current loss of the amorphous metal is, therefore, reduced to approximately 60% of that of the permalloy, with the result that the magnetic head employing an amorphous metal alloy possesses recording and reproducing sensitivities higher than the magnetic head employing a permalloy.

Secondly, the magnetic flux density (Bm) of the amorphous alloy of the present invention is considerably higher than that of ferrites and is improved to a value which is almost equal to that of permalloy. The recording medium used in combination with the amorphous magnetic head can, therefore, be composed of material having a coercive force higher than 1000 Oe.

Thirdly, the hardness of the amorphous alloy of the present invention is as high as that of ferrite. Because of such hardness, the service life of the amorphous alloy head can be as long as that of ferrites. It was, however, surprisingly discovered that the amorphous alloy head can be moved smoothly, since such defects as vacant holes and chipping flaws are not formed even during an extended service life, due to the viscoelasticity of the amorphous metal alloy.

The above described magnetic, electrical and mechanical properties combine to make amorphous metal alloy particularly suited for the core of a magnetic head.

The compositions employed within the scope of this invention include any metals which can be produced in the amorphous form, particularly those compositions represented by the general formula:

$$M_a Y_b$$

wherein M is at least one metal selected from the group consisting of iron, nickel and cobalt and Y is at least one element selected from the group consisting of phosphorous, boron, carbon and silicon, and wherein the percentage represented by atomic percentages in $a$ and $b$ are respectively selected to be from about 60 to about 95 and 5 to 40 with the proviso that $a$ plus $b$ equals 100. In the above general formula M can be a combination of nickel with either palladium or platinum, Y can be at least one element selected from the group consisting of phosphorous and boron. The above components M and Y are preferably in a proportion which corresponds to the eutectic composition of said components.

Specific amorphous alloys exhibiting the desired properties include:

$Fe_{80}P_{13}C_7$
$Fe_{45}Ni_{47}P_8$
$Co_{79}P_{21}$
$Fe_{80}P_{13}B_7$
$Fe_{40}Ni_{40}P_{14}B_6$.

The amorphous metal alloy may be produced by any suitable techniques which cool the molten metal alloy sufficiently rapidly, for example at a rate of $10^6$–$10^9$ °

C/sec, to solidify it without crystallization, thereby obtaining a glassy substance. Such techniques include: a piston anvil method, wherein a drop of liquid alloy is compressed between two opposed piston faces which are moved together at high speed; a double roll method, wherein liquid alloy is compressed between two rollers rotating at high speed, and; a rapid quenching method, wherein the drop is blown onto the inner surface of a cylinder rotating at high speed, for example 5,000–10,000 rpm.

As is known, an amorphous metal alloy is changed to a crystalline metal alloy when heated to a high temperature. This temperature for the proposed compositions was discovered to be in the range between 350° and 450° C.

Generally, the present invention is directed to the use of an amorphous metal alloy in a magnetic head for recording, reproducing or erasing functions, and a combination of these three functions. Such a head comprises at least one head element with a core in the form of a ring and at least one coil. The core is composed of a magnetic core body discontinuous at at least one gap extending from the outer peripheral to the inner peripheral surfaces of the ring shaped core. A spacer is provided in each said gap so as to close the gap. As a result, a magnetic flux is applied from the one or more coils wound around the core body to and/or received by the one or more coils from a part of the magnetic recording medium in contact with the part of the discontinuous core body at said gap.

The number of head elements generally depends upon the number of tracks, usually 1, 2, 4 or 8, and the kind of functions to be assigned to one head element. Each head element may include, in addition to a core body and at least one coil, for example, a means for securing the core body to the casing of the magnetic head. The core is in the form of a regular or irregular ring, which can be of any shape which allows the close curved-magnetic flux lines to pass through the core body via the gap(s). Hence, it is to be understood that the ring may have various outer and inner peripheral configurations, such as a circle, rectangle, square, oval, or rectangle with rounded corners, etc. The core body should be provided with at least one gap, so that a part of the leakage flux running through the gap can pass through the area of recording medium brought into contact with the discontinuous part of the core body. The core body is usually divided into two symmetrical sections by two gaps. The gaps are filled with inserts consisting of, for example, a Cu-Be alloy, titanium or resin. The magnetic recording medium in contact with the core body is usually moved with respect to the fixed magnetic head, but occasionally the magnetic head as well as the recording medium may be moved to cope with a high recording density.

The invention is further illustrated by way of the examples shown below. In these examples, since the starting materials consisted of only one of the above mentioned M and Y, and were powders of high purity, the powders were first changed into a sintered body so as to avoid contamination by impurities during the production procedure. It should however be understood that the process for producing the amorphous metal alloy is not limited to that of the examples in the aspects of either impurities contained in the starting materials or the preliminary production of the sintered body.

EXAMPLE 1

An amorphous metal alloy of $Fe_{80}P_{13}C_7$ was produced by the following procedure. Electrolytic iron powders, red phosphorous powders and carbon powders were mixed in amounts of 90.3, 8.1 and 1.6 by weight parts, respectively. The mixed powders were pressed at a pressure of 35 kg/mm² to obtain a green compact. This green compact was heated in a vacuum at a rate of 30° C/hour, up to 500° C, and was maintained at a temperature of 500° over a period of 24 hours. This caused a preliminary sintering reaction. The so treated compact was then heated at 800° C over a period of 48 hours, thereby obtaining a sintered body. This sintered body was heated from room temperature to a temperature above its melting point. The molten alloy at a temperature of 1,200° C was quenched at $10^{8°}$/sec by spraying the molten alloy onto the inner surface of a cylinder rotating at 5,000 r.p.m. A metallic sheet having a thickness of 100 μm was thus obtained. The obtained alloy plate was subjected to X-ray diffraction measurement, which showed the plate to be 75% amorphous, i.e. the remaining 25% of the alloy being crystalline.

Six sheets were produced by the above procedure. A film of thermosetting epoxy resin, having a thickness of 1 μm, was inserted between each two of the amorphous alloy sheets. The laminated structure 1 (FIG. 1), composed of the six sheets, was heated at 140° C over a period of 4 hours to bond the sheets 2 to each other. Another six sheets were produced by the above procedure. Another laminate was produced by the above procedure from said other six sheets. The thickness (t) of each of the laminates was 600 μm. The dotted line in FIG. 1 divides the surface of the laminate 1 into a central area 3 at one side of the laminate and an outer area adjoining the central area. The central area 3 defined by both the dotted line and the one side of the laminate structure 1 was ground to remove the one side of the central part of the laminate, thereby obtaining half of a ring shaped body, which consisted of the outer area of the laminate structure. Another half of a ring shaped body was produced by the above procedure. The so ground laminates were connected to each other through inserts 5 of Cu-Be alloy having a thickness ($t_2$) of 2 microns, thereby forming a magnetic head element 4. The produced magnetic head element 4 was incorporated in a conventional casing.

The manufactured magnetic head was subjected to a wear test under the conditions of: contacting pressure, 3.4 gr/mm²; ambient temperature, 23°±1° C; humidity, 65±5%; running speed of magnetic tape, 19 cm/sec, and; duration, 2500 hours. The wear of the magnetic head in this test was 7 μm.

For comparison purposes conventional magnetic heads including a magnetic core, which consisted of either of 80Ni-20Fe permalloy, sintered Mn-Zn ferrite or single crystal of Mn-Zn ferrite, were subjected to the above mentioned wear test. The amounts of the permalloy and ferrites heads worn was approximately 400 μm and 10 μm, respectively. The magnetic heads employing the sintered ferrite or the single crystalline ferrite cores lost their initial running characteristics after about 1500 hours use, because of vacant holes and chipped flaws formed on the contacting surface of the cores.

One of the laminates of amorphous alloy sheets was also subjected to magnetic and electrical measurements. The results are illustrated in Table I.

Table 1

| | |
|---|---|
| Coercive Force (Oe) | 0.02 |
| Maximum Magnetic Flux Density (G) | 8,700 |
| Specific Resistivity (μΩ-cm) | 160 |
| Initial Permeability | 24,500 |
| Hardness (Hv) | 650 |

The Curie temperature of the tested amorphous alloy was 360° C.

EXAMPLE 2

A magnetic head, in which an amorphous metal alloy of $Fe_{45}Ni_{47}P_8$ was employed, was produced by the procedure of Example 1, except that a mixture of iron powders, nickel powders and red phosphorous powders was employed in weight proportions of, respectively, 45 parts, 50 parts and 5 parts. The obtained results of the tests for magnetic, electric, mechanical and crystallographic properties are illustrated in Table II.

Table II

| | |
|---|---|
| Coercive Force (Oe) | 0.02 |
| Maximum Magnetic Flux Density (G) | 7,000 |
| Specific Resistivity (μΩ-cm) | 175 |
| Initial Permeability | 23,000 |
| Hardness (Hv) | 720 |
| Testing Conditions of Wear | |
| Running Speed of Tape (cm/sec) | 19 |
| Duration (hours) | 25,000 |
| Amount of Wear (μm) | 6 |
| Amorphous Degree (%) | 75 |

EXAMPLE 3

A magnetic head, in which an amorphous metal alloy composed of $Co_{88}P_{12}$ was employed, was produced by the procedure of Example 1, except that a mixture of cobalt powders and red phosphorous in weight proportions of 88 parts and 12 parts, respectively, was used. The obtained results of the same tests as in Example 1 were illustrated in Table III.

Table III

| | |
|---|---|
| Coercive Force (Oe) | 0.06 |
| Maximum Magnetic Flux Density (G) | 5,500 |
| Specific Resistivity (μΩ-cm) | 150 |
| Hardness (Hv) | 700 |
| Testing Conditions of Wear | |
| Running Speed of Tape (cm/sec) | 19 |
| Duration (hours) | 2,500 |
| Amount of Wear (μm) | 8 |
| Amorphous Degree (%) | 65 |

EXAMPLE 4

Figure 2:
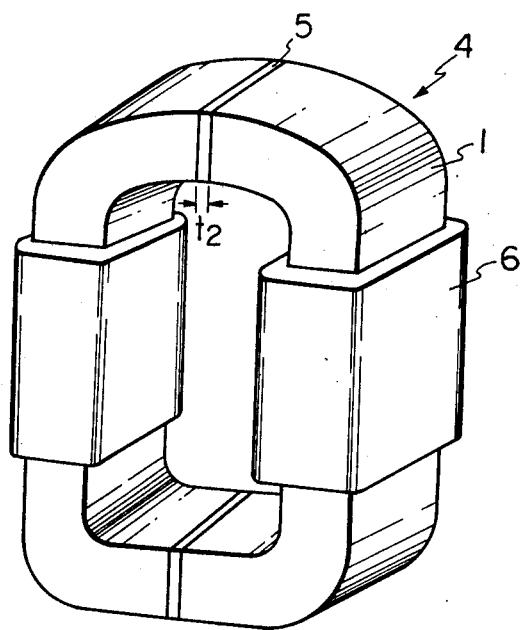

The procedure of Example 1 was repeated, except that instead of grinding, blanking was employed to shape the laminates as illustrated in FIG. 2. The results of the same tests as in Example 1 were the same as those of Example 1.

EXAMPLE 5

A magnetic head, in which an amorphous metal alloy composed of $Fe_{80}P_{13}B_7$ was used, was produced by the procedure of Example 1, except that a mixture of Fe, P and B powders in weight proportions of 90.3, 8.1 and 1.6 parts, respectively, was used. The obtained results of the same tests as in Example 1 were illustrated in Table IV.

Table IV

| | |
|---|---|
| Coercive Force (Oe) | 0.08 |
| Maximum Magnetic Flux Density (G) | 9,000 |
| Specific Resistivity (μΩ-cm) | 160 |
| Initial Permeability | 25,000 |
| Hardness (Hv) | 630 |
| Testing Conditions of Wear | |
| Running Speed of Tape (cm/sec) | 19 |
| Duration (hours) | 2,500 |
| Amount of Wear (μm) | 8 |
| Amorphous Degree (%) | 85 |

EXAMPLE 6

A magnetic head, in which an amorphous metal alloy composed of $Fe_{40}Ni_{40}P_{14}B_6$ was used, was produced by the procedure of Example 1, except that a mixture of Fe, Ni, P and B powders in weight proportions of 44, 46.4, 8.5 and 1.1 parts respectively was used. The results of the same tests as in Example 1 are illustrated in Table V.

Table V

| | |
|---|---|
| Coercive Force (Oe) | 0.03 |
| Maximum Magnetic Flux Density (G) | 8,000 |
| Specific Resistivity (μΩ-cm) | 175 |
| Initial Permeability | 50,000 |
| Hardness (Hv) | 720 |
| Testing Conditions of Wear | |
| Running Speed of Tape (cm/sec) | 19 |
| Duration (hours) | 2,500 |
| Amount of Wear (μm) | 6 |
| Amorphous Degree (%) | 75 |

What we claim is:

1. In a magnetic head comprising at least one head element, which head element comprises a core in the form of a ring and at least one magnetic coil, which core is composed of a magnetic core body discontinuous at at least one gap extending from the outer peripheral to the inner peripheral surfaces of the ring shaped core and a spacer inserted into each said gap, a coil, a magnetic flux being applied from the coil received by the coil from a part of magnetic recording medium in contact with the discontinuous part of said core body at said one gap, the improvement comprising employing as said core body a metal which is at least a 50% amorphous metal alloy.

2. A magnetic head according to claim 1, in which said metal body is an amorphous metal alloy of the general formula:

$$M_aY_b$$

wherein M is at least one metal selected from the group consisting of iron, nickel and cobalt and Y is at least one element selected from the group consisting of phosphorous, boron, carbon and silicon, and wherein the percentage represented by atomic percentages in $a$ and $b$ are respectively selected from about 60 to about 95 and 5 to 40 with the proviso that $a$ plus $b$ equals 100.

3. A magnetic head according to claim 1, in which said metal body is amorphous metal alloy of the general formula:

$$M_aY_b$$

wherein M is a combination of nickel with either of palladium or platinum, and Y is at least one element selected from the group consisting of phosphorous and boron, and wherein the percentages represented by atomic percentages in $a$ and $b$ are respectively selected from about 60 to about 95 and from about 5 to about 40 with the proviso that $a$ plus $b$ equals 100.

4. A magnetic head according to claim 2, in which M is Fe and Y is P and C.

5. A magnetic head according to claim 2, in which M is Fe and Ni and Y is P.

6. A magnetic head according to claim 2, in which M is Co and Y is P.

7. A magnetic head according to claim 2, in which M is Fe and Y is P and B.

8. A magnetic head according to claim 2, in which M is Fe and Ni and Y is P and B.

9. A magnetic head according to claim 1, in which said metal body exhibits a coercive force of not more than 0.2 Oe, a maximum magnetic flux density of not less than 5,500 Gauss, a specific resistivity of not less than $150 \times 10^{-6}$-cm, an initial permeability of not less than 20,000, and Vickers hardness of not less than 600.

10. A magnetic head according to claim 2, in which M and Y are present in a proportion corresponding to the eutectic composition of the components making up M and Y.

11. A magnetic head according to claim 3, in which M and Y are present in a proportion corresponding to the eutectic composition of the components making up M and Y.

12. A magnetic head according to claim 2, wherein $a$ is from 79 to 92 and $b$ is from 21 to 8.

13. A magnetic head according to claim 1, wherein said metal is at least a 75% amorphous alloy.

* * * * *

UNITED STATES PATENT OFFICE
CERTIFICATE OF CORRECTION

Patent No. 4,079,430              Dated March 14, 1978

Inventor(s)     Hiroki Fujishima, et al

It is certified that error appears in the above-identified patent and that said Letters Patent are hereby corrected as shown below:

Column 6, line 44: "from the coil" should be --from the coil or--.

Signed and Sealed this

Seventh Day of November 1978

[SEAL]

Attest:

RUTH C. MASON  
Attesting Officer

DONALD W. BANNER  
Commissioner of Patents and Trademarks

UNITED STATES PATENT AND TRADEMARK OFFICE
CERTIFICATE OF CORRECTION

PATENT NO. : 4,079,430
DATED : March 14, 1978
INVENTOR(S) : Hiroki Fujishima, et al It is certified that error appears in the above—identified patent and that said Letters Patent is hereby corrected as shown below:

Column 6, line 43; cancel "a coil,"

Signed and Sealed this

Fifteenth Day of June 1982

[SEAL]

Attest:

GERALD J. MOSSINGHOFF

*Attesting Officer*   *Commissioner of Patents and Trademarks*